Nov. 24, 1964    R. B. VOGT    3,158,252
LIVE ROLLER CONVEYOR SYSTEM
Filed June 30, 1961    8 Sheets-Sheet 1

INVENTOR.
Rudolph B. Vogt.
BY Wood, Herron & Evans,
ATTORNEYS.

Nov. 24, 1964   R. B. VOGT   3,158,252
LIVE ROLLER CONVEYOR SYSTEM
Filed June 30, 1961   8 Sheets-Sheet 2

INVENTOR.
Rudolph B. Vogt.
BY
Wood, Herron & Evans
ATTORNEYS

Nov. 24, 1964 — R. B. VOGT — 3,158,252
LIVE ROLLER CONVEYOR SYSTEM
Filed June 30, 1961 — 8 Sheets-Sheet 3
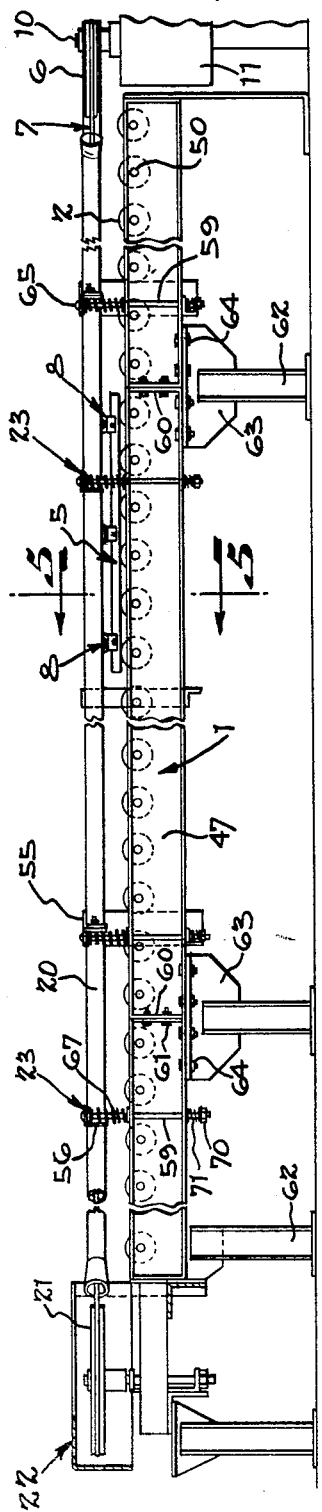
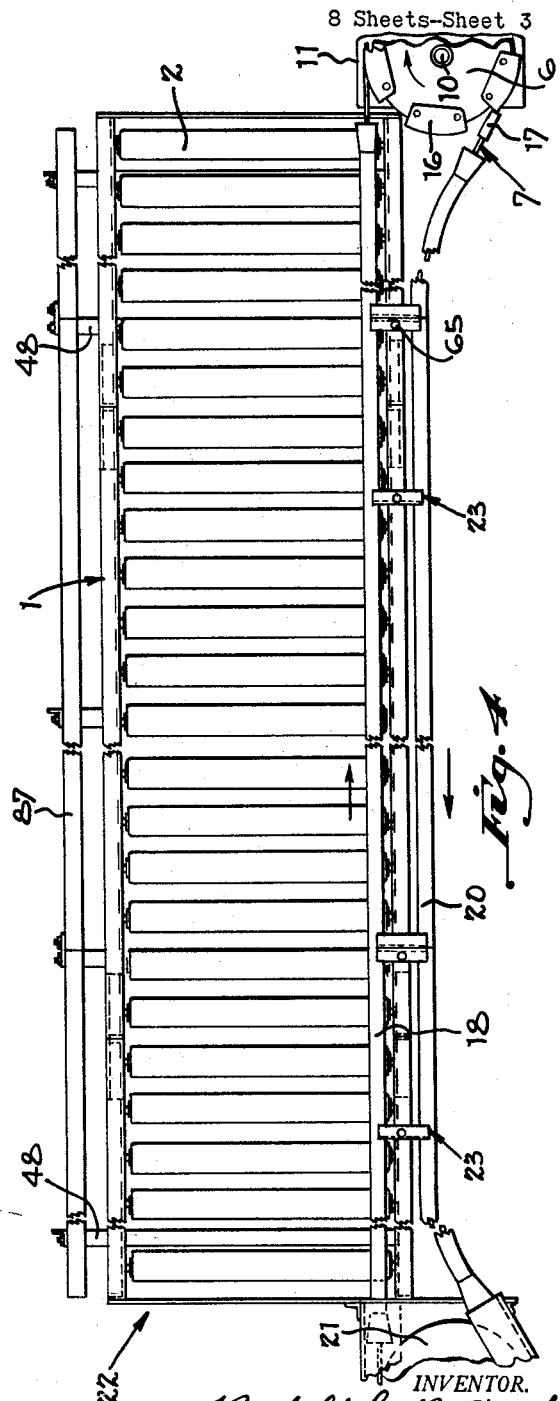
INVENTOR.
Rudolph B. Vogt.
BY Wood, Herron & Evans.
ATTORNEYS.

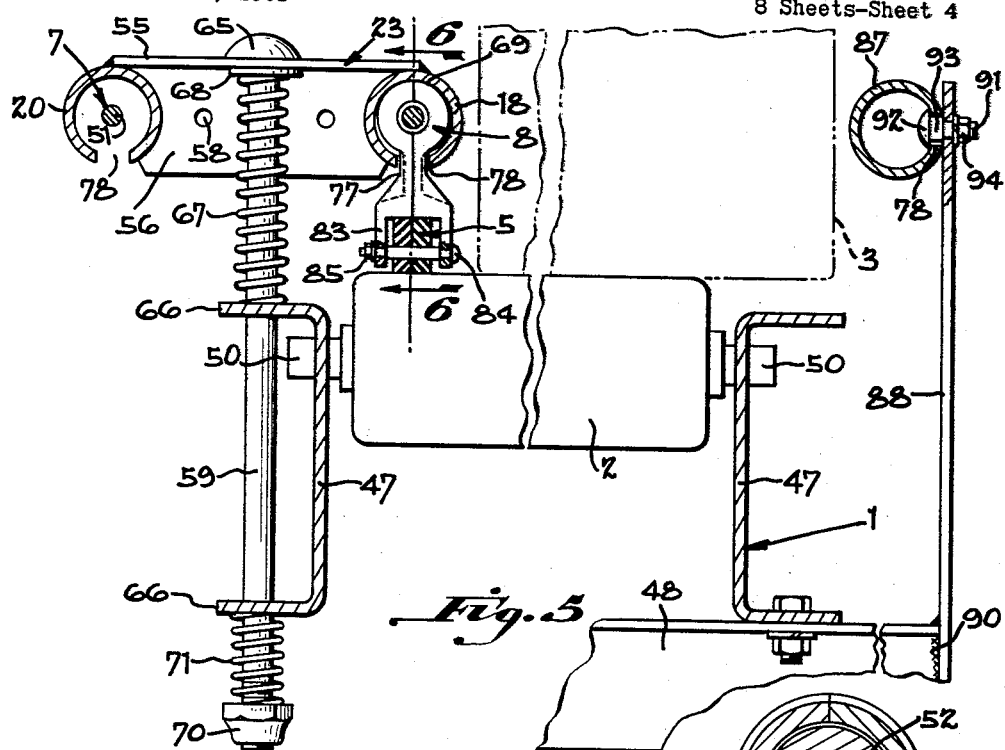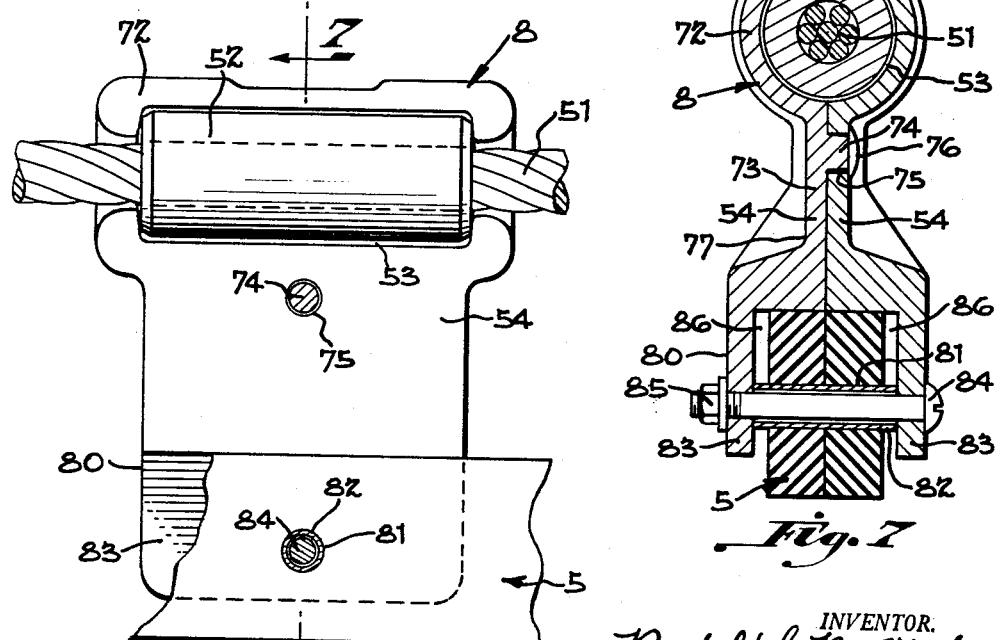

INVENTOR.
Rudolph B. Vogt.
BY
Wood, Herron & Evans.
ATTORNEYS.

Nov. 24, 1964

R. B. VOGT 3,158,252

LIVE ROLLER CONVEYOR SYSTEM

Filed June 30, 1961

INVENTOR.
Rudolph B. Vogt.
BY Wood, Herron & Evans.
ATTORNEYS.

Nov. 24, 1964    R. B. VOGT    3,158,252
LIVE ROLLER CONVEYOR SYSTEM
Filed June 30, 1961    8 Sheets-Sheet 7

INVENTOR.
Rudolph B. Vogt.
BY Wood, Herron & Evans.
ATTORNEYS.

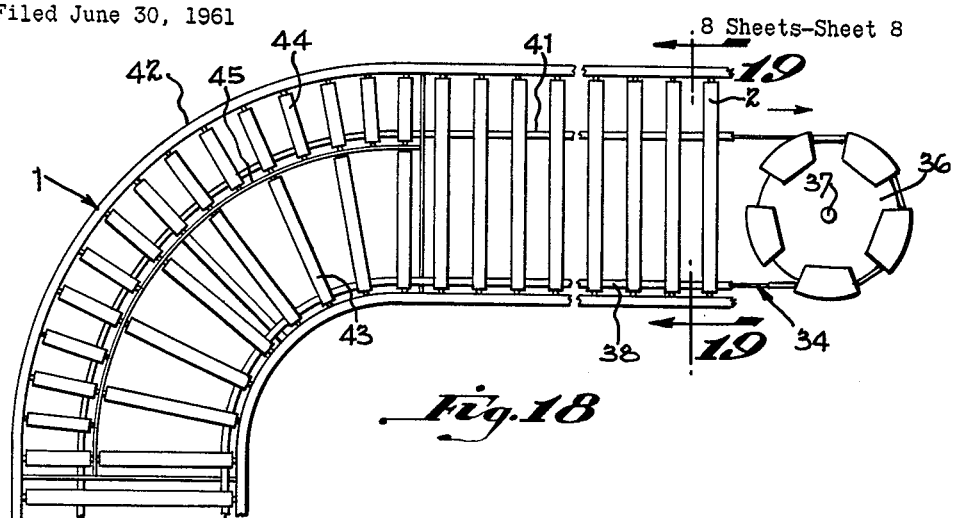
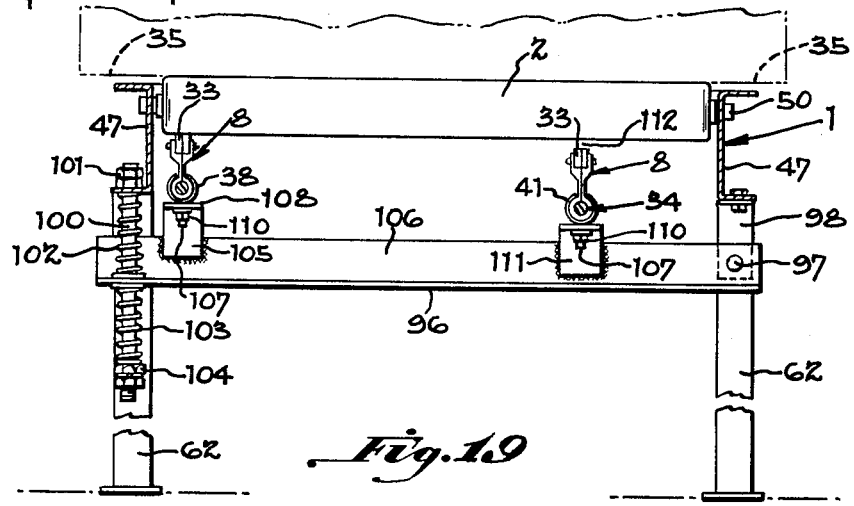
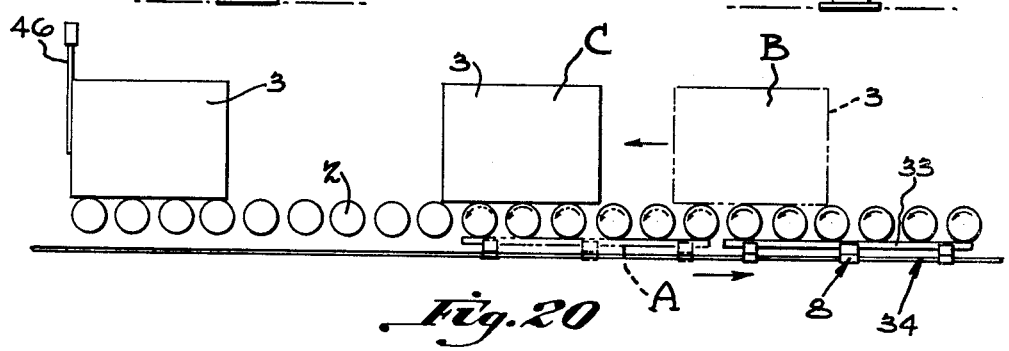

3,158,252
LIVE ROLLER CONVEYOR SYSTEM
Rudolph B. Vogt, Cincinnati, Ohio, assignor to The E. W.
Buschman Company, Cincinnati, Ohio, a corporation
of Ohio
Filed June 30, 1961, Ser. No. 121,170
7 Claims. (Cl. 198—127)

This invention relates generally to conveyors of the roller type and is directed in particular to a conveyor system known in the industry as a ripple drive live roller conveyor, which is used in transporting and storing articles.

Generally speaking, a ripple drive conveyor system comprises a conveyor frame extending in a straight line, or having inclined or curved sections, and including rotatable rollers journalled within the frame. The arrangement of rollers is generally similar to a conventional gravity type conveyor; however, in the ripple drive live roller conveyor, a driving system is provided, which includes a ripple pad or section frictionally engaging the rollers, so as to impart periodic rotary motion to the rollers as the pad or section advances. In other words, rotary motion is imparted to a group of rollers in the form of a ripple which advances with the ripple pad, while the rollers on the leading and trailing sides of ripple pad are inactive. A conveyor system of this general type is disclosed in U.S. Patent 2,253,198 to J. E. Regan, issued on August 19, 1941.

Ripple drive conveyors are of particular advantage for use as storage conveyors, wherein the articles may be placed upon the rollers upstream along the conveyor, then advanced by operation of the ripple section to a stop element at the downstream storage or discharge end of the conveyor, thus adapting a series of articles, such as cartons, to accumulate as a solid row at the downstream end, to be unloaded at random. One advantage of the ripple drive arises from the fact that the driving force is imparted intermittently to each individual article accumulated at the storage portion, as distinguished from continuous drive systems, wherein the driving force is imparted collectively to all of the arrested articles. Accordingly, the ripple drive system requires only a fraction of the power as is required to energize a conventional live roller conveyor in which all of the rollers are driven continuously. Moreover, the ripple conveyor handles the articles more gently and provides more convenient unloading of the articles, since the arrested articles in the row are not constantly forced under pressure against one another.

The conventional ripple drive conveyor system of this character, while possessing the advantages outlined above, is relatively expensive, being powered either by a flight belt or by a sprocket chain which advances the ripple pad or section linearly while holding it in frictional engagement with the surface of the rollers. However, in order to provide the necessary frictional engagement, it is necessary to provide pressure rollers or other means along the length of the conveyor arranged to hold the ripple pad in pressure engagement with the surface of the rollers, thus resulting in a relatively complex and expensive structure.

One of the primary objectives of the invention has been to provide a ripple drive conveyor system of simplified construction, which is more reliable in operation than ripple conveyor systems which have been available in the past, and which is flexible as to installation and operating characteristics.

According to this aspect of the invention, the ripple drive is imparted to the conveyor rollers by a cable system of the type disclosed in Patent No. 2,633,226, issued on March 31, 1953 to Rudolph B. Vogt, the present inventor. In general, the prior Vogt patent discloses a simplified trolley-type conveyor, comprising a cable system or loop having a series of cylindrical lugs permanently joined to the cable at spaced intervals, the cable runs passing through tramways or tubes which act as the conveyor trackway. The lugs provide a sprocket type engagement with a driving sheave and also provide means for mounting a series of trams which surround the driving lugs and which include hangers depending downwardly through an open longitudinal slot formed in the supporting tramways or tubes. The weight load of the articles to be conveyed is thus carried by the trams which are slidably supported within the tube, such that the tube and cable system may be used in place of the conventional track and trolley arrangement.

In its preferred form, the cable is fabricated in sections, for example one-hundred feet in length, with cylindrical driving lugs located along the cable section at a given uniform spacing, for example, on one foot centers. The adjoining ends of the sections include cylindrical lugs substantially half the length of the driving lugs, and the adjoining ends of the cable sections are connected together or spliced by installing the two half-length lugs in end-to-end relationship within the cavity of a tram, the cavity being larger in diameter than the lug to permit rotary movement of the lug and cable sections. By permitting the cable sections to rotate relative to one another, torsional strains in the cable system are relieved, thus prolonging the useful life of the cable and improving its performance. Moreover the use of cable sections and the utilization of the trams as couplers facilitates the installation of the conveyor system in the field.

The present invention utilizes substantially the same tube and cable system; however, the system is modified to advance one or more ripple belts in pressure engagement with the rollers of the conveyor, as distinguished from suspending articles, as outlined above. In one system, utilizing the principles of the present invention, the ripple drive comprises a cable drive having spaced driving lugs passing through a driving tube or tramway mounted above and along one side of the conveyor rollers, with a ripple belt connected to the cable and frictionally engaging the upper surface of the rollers.

Another objective of the invention has been to provide a structure which adapts the ripple belt or belts to be installed on the conveyor system in a simple convenient manner and which adapts the belt to be replaced conveniently should it become worn after prolonged service.

According to this aspect of the invention, the ripple belt is connected to several of the driving lugs of the cable by means of trams or brackets in the form of half-sections which are nested together, and which includes a cavity loosely enclosing the driving lug, the bracket having a shank portion which projects outwardly through the longitudinal slot of the tramway or tube. The lower portion of the shank includes a forked portion embracing the ripple belt and having a pivot element passing through the belt and providing a pivotal connection which imparts flexibility to the connection. The shank portion of the bracket is guided by the slotted tube, the slotted portion of which slidably engages the shank to hold the ripple belt properly in alignment, while the tube itself yieldably forces the bracket and belt into frictional engagement with the rollers. The split construction of the brackets allows them to be mounted conveniently on the cable system in the field, and to be demounted for belt replacement without disturbing the conveyor structure.

A further objective of the invention has ben to provide a mounting structure for the driving tube, which urges the tramway or tube under predetermined pressure toward the rollers, and which may be adjusted in a convenient manner in accordance with the desired operating conditions.

In general, the tramways or tubes each include a series of bolts secured thereto and passing slidably through the frame of the conveyor along one side. Compression springs are mounted on the bolts and the bolts include adjustment nuts which are adapted to preload the compression springs, thereby to yieldably urge the slotted tube toward the rollers. This force is transmitted through the brackets to the ripple belt to provide its frictional engagement with the surface of the rollers.

Another feature of the invention resides in arrangement whereby one of the tubes of the driving system performs its normal function of advancing the ripple belt, and also serves as a guide means to prevent dislodgement of the articles as they are advanced along the conveyor rollers.

According to this aspect of the invention, the cable tube of the driving system is mounted to an elevation above the top surface of the rollers in a plane suitable to confine the articles on the conveyor rollers along one side. A similar but inactive tube is mounted in the same plane as the cable tube along the opposite side of the conveyor frame, the second tube being attached to the frame by means of screws passing through the slotted portion of the tube. This arrangement is of particular advantage in confining the articles as they advance around the curved sections of the conveyor.

The present combination of the cable drive and ripple belt is adapted to various conveyor arrangements, utilizing the same principle. Thus, in one arrangement, the cable system may be in the form of a driving run carried in a driving tube above and along one side of the conveyor rollers, with a return tube for the return cable run mounted parallel with the driving run but in outboard position. In another form, the conveyor may be of endless loop formation, such as a rectangle having curved corner sections, with a single cable loop and driving tube extending around the conveyor loop, and with one or more ripple belts in driving engagement with the rollers. The same cable and tube combination is also adapted to drive upwardly or downwardly inclined conveyor sections, whereby articles are transported from one floor or level to other levels.

In the several versions referred to above, the ripple belts act upon the top surface of the rollers, so as to advance the article in the same direction and the same speed as the ripple belt. However, in another modified form, utilizing the same principle of operation, the tube and cable system is mounted beneath the rollers, with the ripple belt arranged to frictionally engage the bottom surface of the rollers. In this arrangement, the articles are advanced in a direction opposite to the advancement of the ripple belt; moreover, the advancement is intermittent, since the article does not follow the belt, but moves in the opposite direction. Continuous motion in this case may be imparted to the articles by utilizing a driving belt which is continuous, that is, co-extensive with the cable, thereby to drive the rollers continuously.

The various objectives and advantages of the invention will be more clearly apparent to those skilled in the art from the following detailed description taken in conjunction with the drawings.

In the drawings:

FIGURE 3 is a side elevation of the conveyor system.

FIGURE 4 is a top plan view of the system, as projected from FIGURE 3.

FIGURE 5 is an enlarged fragmentary sectional view in the conveyor system, taken along line 5—5 of FIGURE 3.

FIGURE 6 is an enlarged sectional view, taken along line 6—6 of FIGURE 5, detailing one of the brackets which connects the driving cable to the ripple belt or pad which rotates the conveyor rollers.

FIGURE 7 is a sectional view, taken along line 7—7 of FIGURE 6, further detailing the bracket structure.

FIGURE 18 is a fragmentary top plan view illustrating the curved portion of a modified version of the ripple drive conveyor, wherein the driving pad contacts and drives the rollers from beneath, thus providing an uninterrupted conveyor surface which is adapted to advance large packages which overhang the conveyor rollers at opposite sides.

FIGURE 19 is a sectional view taken along line 19—19 of FIGURE 18, further detailing the modified structure.

FIGURE 20 is a diagrammatic view illustrating the operation of the modified conveyor system.

STRUCTURE AND OPERATION GENERALLY

Figure 1:
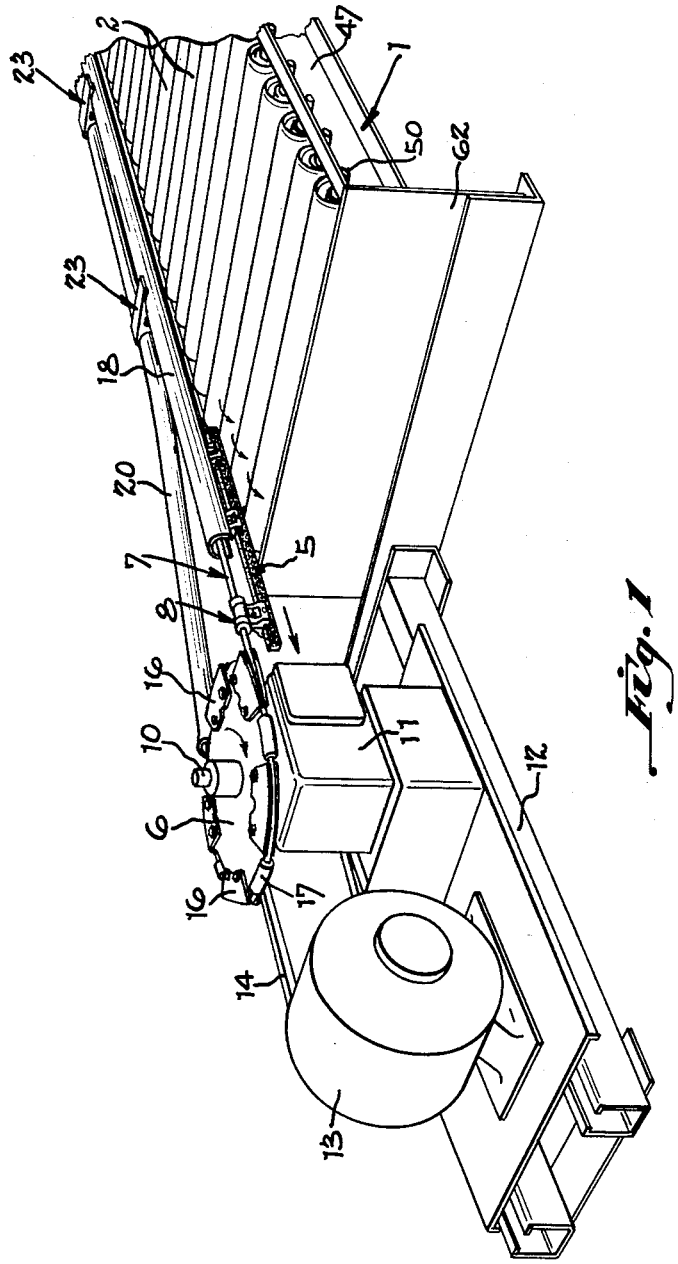
FIGURE 1 is a fragmentary perspective view, generally illustrating a straight line, ripple drive, roller conveyor system constructed in accordance with the present invention, and particularly illustrating the driving mechanism thereof.
Figure 2:
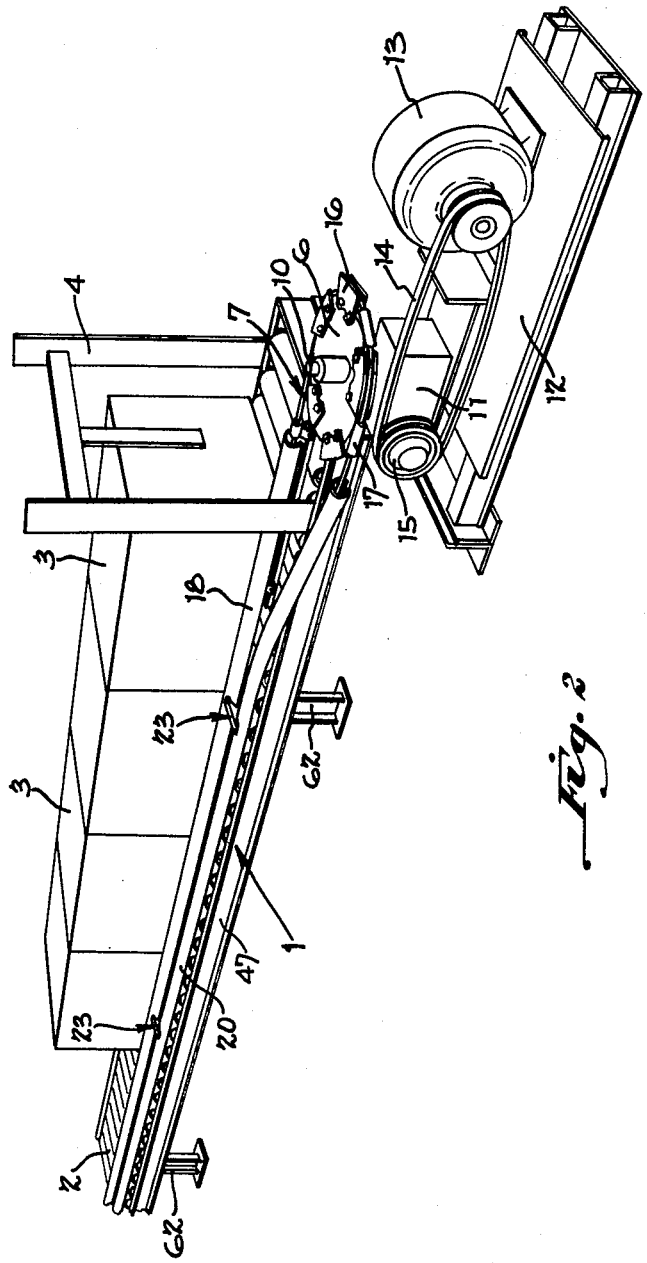
FIGURE 2 is also a perspective view, showing the conveyor system as viewed from the side opposite to that shown in FIGURE 1.

Several versions of the live roller ripple drive conveyor system, embodying the principles of this invention, are disclosed in the drawings. Thus, in FIGURES 1-13, there is disclosed a preferred form of the invention, comprising a storage type conveyor, wherein the driving or ripple belt advances in frictional engagement with the upper surface of the rollers so as to advance the cartons or other articles in the same direction, and at the same rate of speed, as the driving belt. FIGURES 14-17 illustrate the same general system, with the driving belt acting upon the upper surface of the rollers, but applied to slightly modified conveyor systems, such as a closed loop system, and a system which serves different levels or floors of a building.

FIGURES 18-20 also disclose a conveyor system utilizing a cable-driven ripple belt coacting with a series of rollers. However, in this case, the ripple belt is mounted in a position to frictionally engage the lower surface of the rollers. As a consequence, the articles or cartons are advanced in a direction opposite to the direction of motion of the belt and cable system. It will be understood that the articles are advanced intermittently for a predetermined distance each time the driving belt or pad passes beneath and rotates the group of rollers upon which the package is resting. In this arrangement the degree of advancement is determined by the length of the ripple belt; however, continuous advancement may be imparted to the articles by providing a continuous driving belt which is coextensive with the cable system. The general arrangement of the several versions of the conveyor system is described briefly below.

Line Conveyor

Referring to FIGURES 1-13, the straight line conveyor, which constitutes one example of the invention, comprises a longitudinal frame 1 having a series of rollers 2, the opposite ends of which are journalled in anti-friction bearings (not shown) carried by the frame 1. The articles to be conveyed, such as the cartons 3 (FIGURE 2) rest upon the rollers and may be arrested at the storage or discharge end of the conveyor by a stop 4 rising from the frame 1 and arranged to engage the leading carton of the row on the conveyor.

As explained later in detail, one or more ripple belts or pads 5 (FIGURE 1), which form a part of the driving system, advance in frictional contact with the upper surface of the rollers and progressively impart rotary motion to a group of rollers which correspond to the length of the ripple belt. Accordingly, the rollers normally are inactive, except for an advancing, rotating ripple group, activated by the belt, adapting a carton, which is placed on the rollers, to remain stationary until the ripple belt 5 advances in driving contact with the rollers upon which the carton is resting. At this point, the group of rotating rollers advances the carton along with the ripple belt until the carton is arrested at the end of the conveyor run by the stop 4. At the discharge end, the ripple belt 5, moves out of contact with the rollers and passes around the driving sheave 6 and returns to the upstream end of the conveyor, as explained later.

By virtue of the ripple or intermittent operation of the belt 5, the pressure imposed upon the arrested leading carton is extremely low. Otherwise expressed, feeding pressure is imparted individually to each arrested carton at the storage end of the conveyor as the ripple belt advances; accordingly the end pressure acts upon the arrested cartons as a series of impulses, as distinguished from the collective feeding pressure which would be imposed on the row of arrested cartons if the rollers were rotated continuously. By way of example, should the weight-load of each individual carton be sufficient to develop a feeding pressure of five pounds when arrested, the four cartons shown in FIGURE 2 would successively impose a feeding pressure of only five pounds against the stop 4, as the ripple belt advances along this portion of the conveyor system. On the other hand, in a conventional live roller conveyor, wherein the rollers are driven continuously, the feeding pressure against the stop 4 would amount to the collective frictional action of the four cartons, thus imposing a total pressure in the neighborhood of twenty pounds against the stop 4. It is this characteristic of the present structure which adapts it particularly to conveyors of the accumulator type, wherein the articles may be placed on the conveyor at various points to be accumulated or stored temporarily at its downstream end for removal in random fashion.

The ripple belt or pad 5 is advanced along the rollers by a cable system, indicated generally at 7, (FIGURES 1 and 2) which includes cylindrical driving lugs which provide a driving connection with the ripple belt 5 through split brackets or trams, indicated generally at 8, which are described in detail later. As shown generally in FIGURES 1 and 2, the driving sheave 6 is mounted upon a vertical drive shaft 10 projecting upwardly from a speed reduction gear box 11 mounted on a base structure 12. The driving motor 13 is mounted upon the base 12, and is connected by a belt 14 to a pulley 15, which is in driving connection with the speed reduction gear train of gear box 11. The gear box rotates the shaft 10 and sheave 6 in the direction indicated by the arrow (FIGURE 1) so as to advance the cable system 7 and ripple belt 5 in the direction indicated by the arrow. This imparts rotary motion to the rollers 2, as indicated by the arrows (FIGURE 1), so as to advance the cartons at the same rate and in the same direction as the ripple belt, as noted above. The sheave 6 is provided with spaced lugs 16 (FIGURES 1 and 2) which establish a driving connection with the cylindrical lugs 17 of the cable system 7. The driving system does not form an essential part of the invention; therefore, the details have been omitted from the disclosure.

In the form of the invention disclosed in FIGURES 1–13, the straight line conveyor system includes a slotted tramway or driving tube 18 and a slotted return tube 20 guiding the forward and return runs of the cable. As best shown in FIGURE 4, the cable 7 passes through these tubes and about an idler sheave 21 at the upstream end 22 of the conveyor system. It will be noted by the arrows in FIGURE 4, that the driving run of the cable system 7, which passes through the driving tube 18, operates under tension, such that driving pressure is imparted to the ripple belt or pad by the tube section 18, while the belt is pulled along the length of the conveyor with the cable run in tension. As described later, downward pressure is imposed upon the ripple belt 5 through the tube 18 by spring-loaded angle iron brackets 23 (FIGURE 9) which mount the tubes with reference to the conveyor frame 1. The spring-loaded brackets thus develop the pressure for frictional engagement of the ripple belt 5 with the periphery of the live rollers. The brackets 8 include portions projecting through the slotted tubes and connected to the ripple belt, the slotted portion acting as a guide relative to the brackets to hold the belt in engagement with the rollers, as explained in detail later.

*Loop Type Conveyor*

Figure 14:
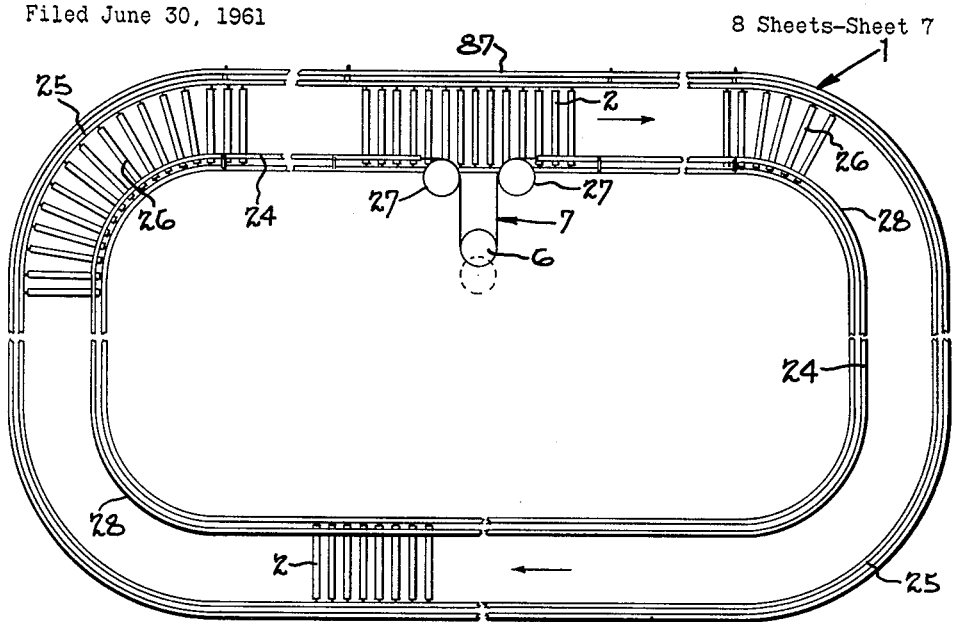
FIGURE 14 is a diagrammatic top plan view, showing the ripple drive conveyor system arranged in the form of an endless loop, as distinguished from the straight line conveyor shown in FIGURES 1-13.

The modified version of the conveyor system, shown in FIGURE 14, is similar to the structure shown in FIGURES 1–13, in that the cable system 7 includes a ripple belt 5 which passes along the upper surface of the rollers, such that the article on the conveyor advances in unison with the ripple belt. In the arrangement shown in FIGURE 14, the system comprises an endless loop conveyor which may be used in sorting articles, or in advancing articles relative to an assembly line or the like.

According to this arrangement, a single cable loop actuates a group of rollers 2 as the belt advances, the cable loop passing through a single, loop-shaped driving tube 24, which is a counterpart of tube 18, previously described with reference to FIGURES 1–13. The rollers 2 are mounted in a frame 1, similar to the frame of the straight line conveyor, except that the frame includes curved sections 25 having radially disposed rollers 26 arranged to convey the articles about the curved sections of the loop. The driving system comprises a driving sheave 6, as described above, which is driven by a speed reduction gear train mounted in a gear box 11 and powered by a motor 13 (not shown), as described above with reference to FIGURE 1. The driving system includes a pair of idler sheaves 27—27, and the gear box and motor unit is adjustable relative to the idler sheaves to adjust the tension of the cable system 7. In this structure the driving tube 24 includes curved sections 28 corresponding to the curved frame sections 25, arranged to guide the cable and ripple belt in frictional engagement with the radial rollers 26 around the curved portions of the conveyor system.

*Inclined Conveyor Sections*

Figure 15:
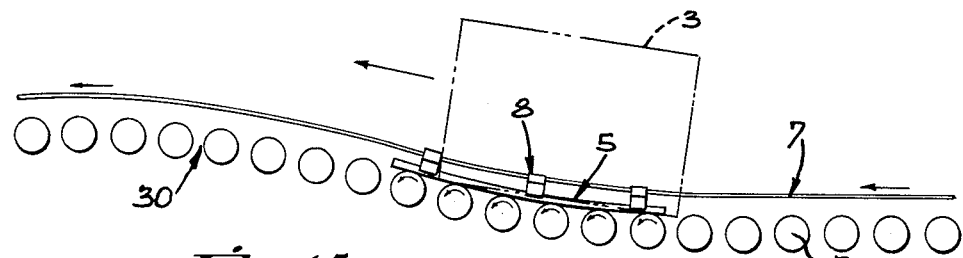
FIGURES 15 and 16 are diagrammatic side views showing inclined conveyor sections which are utilized in installations where the conveyor system communicates with one or more levels or floors of a building.
Figure 16:
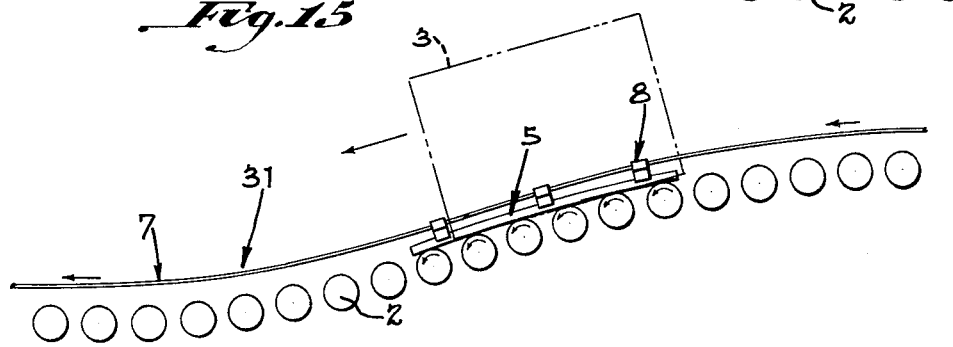

The conveyor sections illustrated diagrammatically in FIGURES 15 and 16 are also modified versions of the system shown in FIGURES 1–14, wherein the pad or belt engages the upper surface of the roller. The arrangement shown in FIGURE 15 is intended to transport the articles indicated at 3 upwardly in an inclined plane from one level to a higher level. In this structure, the rollers 2 are journalled in a frame (not shown) similar to frame 1, having an upwardly inclined or curved section, indicated generally at 30. The cable system 7 includes a ripple belt 5, as described earlier, the cable system being guided through a driving tube 18 (not shown) parallel with the inclined and level portions of the frame, the pad being arranged to rotate the rollers in group formation as it advances along the frame, including the inclined section or sections.

The conveyor section illustrated diagrammatically in FIGURE 16 is similar to that shown in FIGURE 15, except that it is arranged to transport the articles downwardly in an inclined plane from an upper to a lower level. In this arrangement, the rollers 2 are journalled in a frame (not shown) having a downwardly inclined section, indicated generally at 31. The ripple belt 5, in this instance, acts as a brake with respect to the group of rollers which it engages, so as to regulate the downward rate of descent of the article or carton indicated at 3. This arrangement is intended for use particularly where the articles must be lowered at a controlled rate, as distinguished from a gravity type roller conveyor. In operation, the article is placed upon a level run of the conveyor system at the higher level and remains stationary until the ripple belt engages the group of rollers upon which it is resting, at which time the article is advanced along with the ripple belt down the inclined section to its discharge point.

Continuous Drive Line Conveyor

Figure 17:
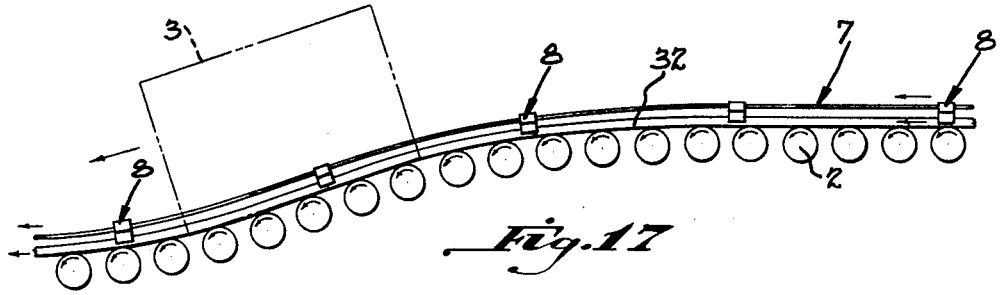
FIGURE 17 is a view similar to FIGURE 16, showing the conveyor system equipped with a continuous belt or driving pad.

The modified conveyor section shown in FIGURE 17 is also provided with a driving pad or belt which frictionally engages the upper surface of the rollers. In this version however, the driving belt, which is indicated at 32, is coextensive with the cable system 7 throughout the length of the conveyor, and is connected to the cable system by split brackets 8 which engage the driving lugs throughout the length of the cable loop. This version of the system distinguishes functionally from the structures described earlier in that all of the rollers of the system are driven continuously. Accordingly, the articles are advanced continuously in unison with the belt 32.

Reverse Roller Drive

The conveyor system illustrated in FIGURES 18-20 embodies the same cable-driven, ripple belt principle described above; however, in this version, the ripple belt or pad, which is indicated at 33, is carried by a cable system 34 mounted beneath the rollers 2. As a consequence, the cartons or other articles advance in stepwise fashion in a direction opposite to the direction of advancement of the cable system and ripple belt. One particular advantage of this arrangement arises from the fact that, since the driving cable and associated parts are located beneath the rollers, the top surface of the conveyor system is devoid of obstructions, permitting the transportation of large cartons or other articles which overhang the side rails of the conveyor system on opposite sides, as indicated by broken lines at 35 in FIGURE 19.

As shown generally in FIGURE 18, the cable system 7 is driven by a sheave 36, which is mounted upon a vertical shaft 37 projecting upwardly from a speed reduction unit (not shown), corresponding to the driving system shown in FIGURE 1. The cable system passes through a driving tube 38 mounted beneath the rollers and including a ripple pad or belt 33 which is connected to the cable system 34 through brackets 8. The arrangement is such that the belt is spring-urged into frictional engagement against the lower surface of the rollers to provide the frictional ripple drive, the direction of motion being indicated by the arrows in FIGURE 20. At the storage or discharge end of the conveyor system, there is provided an idler sheave (not shown), the return run of the cable system being supported in a return tube 41, which is mounted in a plane below the driving tube 38, such that the ripple belt 33 does not contact the rollers along its return run.

As shown in FIGURE 18, the frame 1 in which the rollers 2 are journalled, is provided with a curved section 42 which has a shorter radius than the curved section 25, shown in FIGURE 14. In the modified arrangement, the curved section 42 includes a series of radially arranged rollers 43, which are powered by the ripple belt 33; however, because of the spacing of the radial rollers at the outer portion of the curve supplemental rollers 44, which act as idlers, are journalled in the frame. For this purpose the frame includes an intermediate arcuate section 45, the rollers 44 having inner ends journalled in section 45.

It will be understood that in the arrangement shown (FIGURES 18-20), the cartons are advanced in stepwise fashion and into engagement with a stop 46 to provide a storage conveyor when utilizing a sectional ripple belt 33. On the other hand, this arrangement may be provided with a continuous driving belt, as shown in FIGURE 17, in which case the articles are advanced in a continuous stream.

STRUCTURAL DETAILS

Line Conveyor

In the preferred embodiment of the invention, shown in FIGURES 1-13, the frame 1 is similar to a conventional gravity-type conveyor, comprising a pair of longitudinal channels 47—47 (FIGURE 5) secured in spaced relationship by cross members 48. The shafts 50 of the rollers 2 have opposite end portions projecting through the channels 47 at opposite sides. The rollers are of tubular construction and include anti-friction bearings (not shown), which journal the rollers with respect to the shafts.

The cable system 7 (FIGURES 5-7), as disclosed in the aforesaid Vogt Patent No. 2,633,226, comprises a stranded flexible cable 51 in the form of a loop passing about the driving sheave 6 and idler sheave 21, as explained earlier (FIGURE 4). The cable is provided with spaced cylindrical driving lugs 52, which are attached permanently at spaced points along the cable; the lugs provide a driving connection with respect to the ripple belt or belts 5. The cable 51 is made up of a series of sections, and the adjoining ends are provided with driving lugs which are substantially one-half the length of the lug 52 (FIGURE 6). These half-length lugs are mounted in end-to-end relationship in the cavity 53 of the split bracket, previously indicated at 8, formed of half-sections 54—54 (FIGURE 6), thereby to splice the adjoining ends of the cable sections together. By way of example, the cable sections may be made in lengths of one-hundred feet, each end being provided with full-length driving lugs 52 on twelve-inch centers along the cable, with half-length lugs mounted on the opposite ends of each cable section, and also falling on twelve-inch centers.

As noted earlier (FIGURES 1-5), the cable passes through the tramway or driving tube 18 which resides above the rollers at an end portion thereof, and the return tube 20 located at an outboard position relative to frame 1. The driving tube 18 is arranged to spring-load the ripple belt 5 into frictional engagement with the rollers. For this purpose, both tubes 18 and 20 are secured, preferably by welding, to the opposite ends of a series of angle brackets, previously indicated at 23, which are yieldably mounted with respect to one of the channels 47 of the frame. As shown in FIGURES 3 and 4, the tubes are supported at spaced intervals by the angle brackets along the length of the frame.

Figure 9:
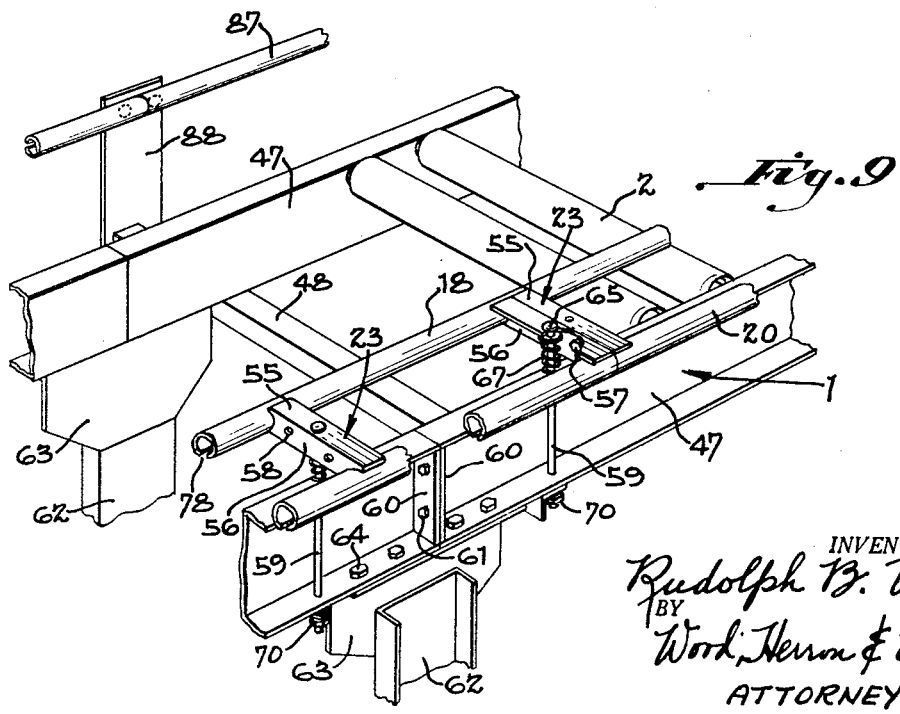
FIGURE 9 is a fragmentary perspective view of a portion of the conveyor, further illustrating the relationship of the parts.
Figure 10:
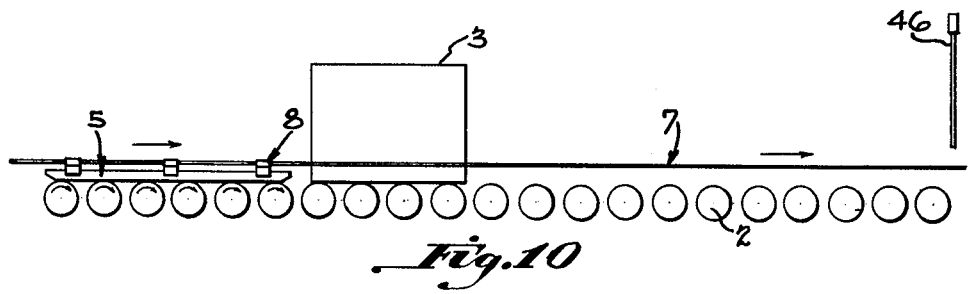
FIGURES 10-13 are diagrammatic views showing the operation of the ripple line conveyor.
Figure 11:
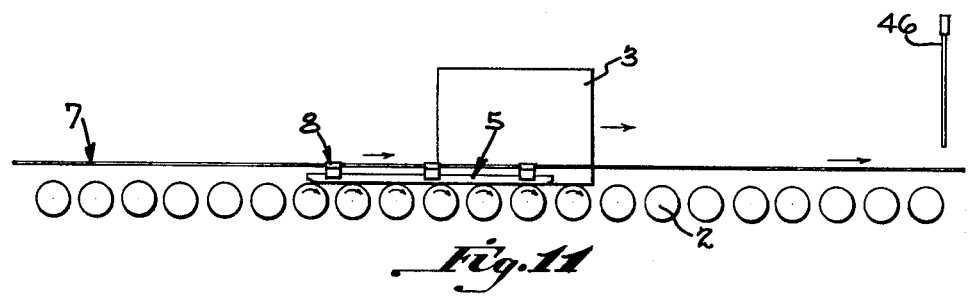

To facilitate manufacture and assembly in the field, the tubes 18 and 20 are fabricated in sections, and the end of each section is provided with an angle bracket 23 arranged to couple the meeting ends of the tube sections to one another. As best shown in FIGURES 5 and 9, the top flanges 55 of the angle irons, at the ends of the sections, are arranged to face in opposite directions, such that the vertical flanges 56 of the angle irons reside in facial engagement, being secured to one another by screws 57 passing through holes 58.

The frame 1 is also of sectional construction to facilitate assembly in the field. Thus, as shown in FIGURE 9, the adjoining ends of the channel irons 47 are provided with vertical end flanges 60, preferably welded in place and joined in facial engagement by screws 61 passing through the flanges 60.

The assembled frame 1 is supported with respect to the floor by a series of vertical channel irons 62 (FIG- URES 3 and 9) rising from the floor and including mounting brackets 63, which are secured by screws 64 to the lower flange of the channels 47. It will be noted in FIGURE 3, that the couplings of the tubes (angle brackets 23—23) are staggered in relation to the coupling (end flanges 60—60) of the channel sections to avoid interference with the bolts 59, which resiliently support the tramway tubes 18 and 20, as explained below.

As detailed in FIGURE 5 each bolt 59, projects downwardly from the respective angle brackets and includes a head 65 seated against the top flange 55 of the angle bracket. The bolt 59 passes downwardly through holes formed in the horizontal flanges 66 of the channel iron 47, and is shiftably confined therein for vertical adjustment. A compression spring 67 is disposed between the top flange 55 of angle bracket 23 and the flange 66 of the channel 47, being seated against a washer 68 disposed beneath flange 55. The lower end of the bolt 59 is threaded and includes an adjustment nut 70 which provides a self-locking engagement with the bolt. A compression spring 71 is interposed between the nut 70 and lower flange 66.

The spaced compression springs 71, along the length of the tramway tubes 18 and 20, are arranged to hold the ripple belt 5 yieldably in frictional engagement with the rollers 2. In setting up the conveyor system, the nuts 70 are tightened so as to pull the driving tube 18 (and return tube 20) downwardly against the action of the upper compression springs 67. As the driving tube 18 is drawn downwardly, it engages the top surface of each tram or split bracket 8, thus forcing the brackets and ripple belt 5 downwardly to place the belt under predetermined frictional pressure against the top surface of the rollers 2.

Figure 8:
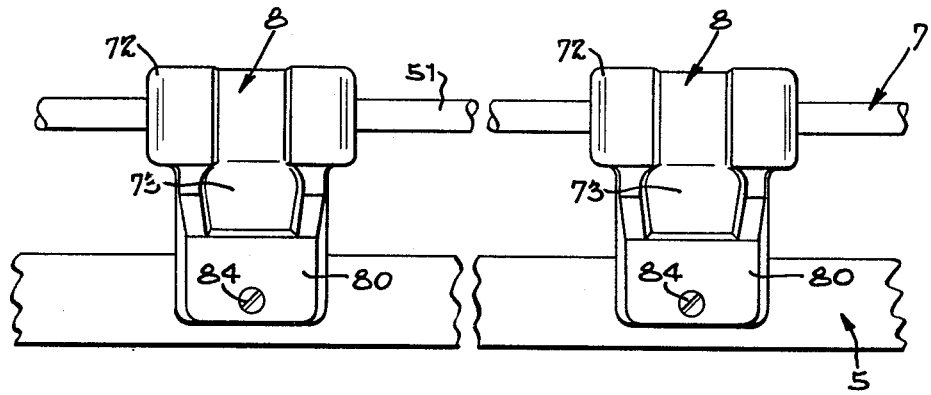
FIGURE 8 is a side elevation, further illustrating the cable bracket and pad assembly.

As best shown in FIGURES 6–8, each tram or split bracket 8 comprises a cylindrical upper tram portion 72 which delineates the cavity 53 in which the driving lugs 52 are nested. The cylindrical portion 72 provides a bearing surface which establishes a sliding engagement with the upper portion of driving tube 18, as indicated at 69 (FIGURE 5). The two half-sections 54, which constitute the bracket 8, are substantially in duplicate, including narrow shank or wing sections 73 extending downwardly from the cylindrical portions 72. However, one of the sections 73 includes an integral rivet 74 adapted to pass through an aperture 75 formed in the mating half-section (FIGURE 7). In assembling the cable system, the two sections are placed in nesting engagement about the driving lug 52, then the projecting end of the rivet is peened over to form a head 76, which permanently joins the half sections together, with the driving lug rotatably confined in the cavity 53. The composite shank assembly 77 projects downwardly through a longitudinal slot 78 formed in the lower portion of the tubes 18 and 20.

The lower portion of each assembled bracket 8 includes a bifurcated lower portion 80 projecting from the shank assembly 77 for mounting the ripple belt or pad 5. In the form shown in FIGURE 7, the belt 5 may comprise a length of commercial belting which is extensively used in V-belt drives, comprising a body formed of rubber or synthetic rubber reinforced with internal cords (not shown) and having an external fabric covering. In the arrangement shown in FIGURE 3, the ripple belt 5 is carried by a set of three brackets 8.

Described in detail (FIGURES 6 and 7) the ripple belt 5 is provided with a series of apertures 81, one for each bracket 8, with a metallic spacer sleeve 82 passing through each aperture. The sleeve has a length dimension equal to the internal spacing of the limbs 83—83 which delineate the bifurcated portion 80 of the bracket. A bolt 84 passes through the limbs 83 and through the sleeve 82 and includes a nut 85 which is tightened to force the limbs 83 into clamping engagement wtih opposite ends of the spacer sleeve 82. This arrangement provides the clearance 86 on opposite sides of the belt 5, the arrangement being such that the belt is free to rock with respect to the bifurcated portion 80 of the split bracket 8.

In the preferred embodiment shown in FIGURES 1–13, the driving tube 18 acts as a rail for guiding the packages or cartons along the conveyor. As shown in FIGURE 5, a coacting guide rail 87 is mounted upon the opposite side of the conveyor, so that the package advances between the guides 18 and 87 which determine the maximum package width, as shown by the broken lines.

The guide rail 87 is supported in the same plane as the driving tube 18, being supported upon a series of vertical bars 88 having lower ends welded as at 90 to the cross members 48. The rail 87 comprises lengths of slotted tramway tubing, similar to the tubing 18 and 20, the tubes 87 being attached to the bars 88 by means of shoulder screws 91, each having a head 92 disposed within the tube 87, with an enlarged shank portion 93 projecting outwardly through the slot 78. The threaded shank of the screw passes through the bar 88 and a nut 94 is threaded thereon. In mounting the tube 87, the scraws 91 are slipped through the slot 78 of the tube and are shifted longitudinally into alignment with the apertures of the bars 88. Thereafter the nuts 94 are threaded on and tightened to clamp the guide rail sections 87 firmly in place on the bar 88.

The structural details of the several versions of the forward roller drive conveyors, shown in FIGURES 14–17 are similar to the line conveyor described above with reference to FIGURES 1–13. Thus, the loop-shaped driving tube 24 (FIGURE 14) is pulled downwardly to hold the ripple belt into frictional engagement with the top surface of the rollers by means of spring-loaded bolts 59, as described above with reference to FIGURE 5. The loop conveyor, similar to the line conveyor, is provided with an outer guard rail 87 of loop formation, which coacts with the loop-shaped driving tube 24 to confine the cartons, as described with reference to FIGURE 5.

The inclined conveyor sections 30 and 31, shown in FIGURES 15 and 16, are also constructed in accordance with the details shown in FIGURE 5. In this structure, the frame 1 is provided with inclined channel irons 47 and inclined cable tubes 18 and 20, including curved portions which blend with the horizontal sections. The continuous drive system shown in FIGURE 17 is also similar to the detailed structure shown in FIGURE 5.

*Reverse Roller Drive Details*

As noted earlier, the reverse roller drive conveyor shown in FIGURES 19 and 20 is utilized in cases where intermittent advancement is desired. This structure has the further advantage of presenting an uninterrupted top surface, adapting the packages or cartons to overhang the frame 1 at one or both sides, as indicated earlier at 35.

Described in detail with reference to FIGURE 19, the ripple belt, previously indicated at 33, is held under pressure against the lower surface of the rollers by a driving tube 38, similar to the tube 18 shown in FIGURE 5. The driving tube 38 is urged upwardly by a series of cross bars 96 which also support the return tube 41, one end of each cross bar 96 being pivotally connected as at 97 to a bracket 98 depending from the channel iron 47 of frame 1.

The opposite end of each cross bar 96 is shiftable vertically along a bolt 100, having an upper end anchored to the channel iron 47 by nuts 101. A compression spring 102 is interposed between the channel iron and cross bar 96, tending to urge the bar 96 downwardly. A second compression spring 103 is mounted on the bolt 100 and is maintained in compression against the lower surface of the cross bar by a pair of adjustment nuts 104, which are threaded upon the lower portion of bolt 100.

The driving tube 38 is mounted with respect to each cross bar 96 by means of an L-shaped bracket 105 welded to the vertical flange 106 of cross bar 96 and rising upwardly therefrom. The driving tube includes a stud 107 passing through the top flange 108 of bracket 105 and anchored thereto by a lock nut 110 threaded on stud 107.

The return tube 41 similarly is supported by L-shaped brackets 111 rising from the cross bars 96, the return tube including similar studs 107 and nuts 110 attaching the tube 2 to the brackets 111. However, the brackets 111 are disposed at a lower plane than the brackets 105 to provide the clearance 112 between the ripple belt 33 and lower surface of the rollers 2.

In setting up the conveyor, the adjustment nuts 104 are tightened to compress spring 103, thereby swinging cross bar 96 upwardly counter to the upper compression spring 102, thereby forcing the ripple belt 40 into frictional engagement with the lower surface of the rollers 2. When the required driving engagement is obtained, the adjustment nuts 104 are tightened against one another to lock them in adjusted position.

OPERATION

Line Conveyor

Figure 12:
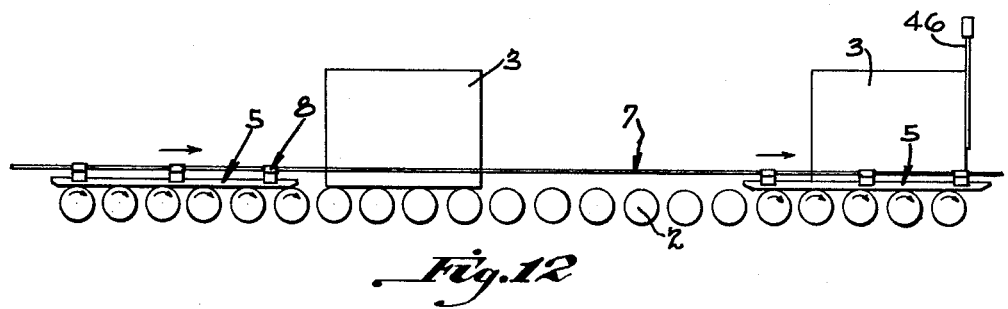
Figure 13:
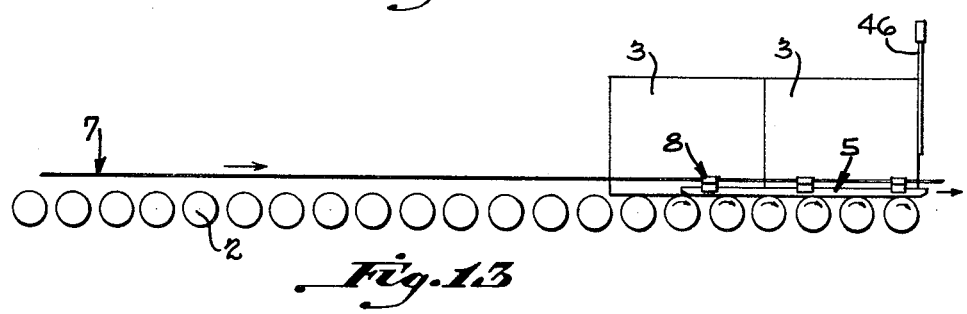

As shown diagrammatically in FIGURES 10–13, the carton 3 remains stationary when it is placed upon the rollers (FIGURE 10) until the ripple belt 5 advances into driving engagement with the rollers upon which the carton is resting. At this point (FIGURE 11) the stationary rollers beneath the carton begin to rotate, thus advancing the carton, as indicated by the arrow until it reaches the stop 46, at which point it is arrested, as shown in FIGURE 12, while the belt continues its advancement, out of driving engagement with the rollers. As noted earlier with respect to FIGURES 1 and 2, during continued advancement beyond the end of the conveyor section, the ripple belt advances with the cable about the driving sheave 6, through the return tube 20 to the upstream end of the conveyor. The carton 3 thus rests in a stationary storage position for subsequent removal from the conveyor. In the meantime, a second carton 3 may be loaded on to the conveyor, where it remains stationary until the rollers upon which it is resting are rotated by the same ripple belt 5 upon its return through the driving tube 18 from the upstream end of the conveyor.

In the form shown in FIGURE 12, the cable system is shown with a plurality of ripple belts. It will be understood that the additional belts increase the frequency of the ripple drive which is imparted to the rollers; hence, the additional belts increase the handling capacity of the conveyor. Whether a single belt or multiple belts are utilized depends upon the desired operating characteristics of the conveyor, but in any event, the driving impulses are transmitted periodically to the arrested cartons to control feed pressure, thus adapting the system to its use as a storage type conveyor.

The operation of the loop-shaped conveyor shown in FIGURE 14 is the same as disclosed in FIGURES 10–13. It will be understood that the loop conveyor may be provided with a stop (not shown), similar to the stop 46 shown in FIGURE 10.

The operation of the inclined conveyor system, shown in FIGURES 14 and 16 is also similar to that described above. However, the ripple belt acts as a brake to control the gravity descent of the carton along the downwardly inclined conveyor section shown in FIGURE 16. The operation of the continuous belt system shown in FIGURE 17 is also similar to that disclosed in FIGURES 15 and 16, except that this arrangement provides continuous advancement, as distinguished from the ripple action provided by the sectional ripple belt.

Reverse Roller Operation

The operation of the modified version shown in FIGURES 19 and 20 is generally similar to the forward driving system shown in FIGURES 10–13, except that the ripple belt 33 rotates the groups of rollers in a reverse direction. Thus, the advancing belt, indicated at A in broken lines in FIGURE 20, provides a ripple action with respect to a group of rollers so as to advance the package, indicated at B, in the direction indicated. The degree of advancement is substantially equal to the length of the belt 33, such that the article advances from the position shown at B to the position shown at C upon each passage of the ripple belt, until the article finally is arrested by the stop 46. It will understood that the frequency of advancement may be increased by installing multiple ripple belts on the conveyor system or by increasing the length of each belt section or sections.

Having described my invention I claim:

1. A live roller conveyor system comprising, a conveyor frame, a series of conveyor rollers having opposite end portions rotatably journalled in said frame, a driving tube extending parallel with said conveyor frame and having a longitudinal slot formed therein, said longitudinal slot facing said rollers, a flexible stranded driving cable passing through said tube, a plurality of driving elements connected to said cable in spaced relationship and projecting outwardly through said slot toward the rollers, said driving elements including bearing means slidably confined within said driving tube, a ripple belt mounted on the outer portion of said driving elements, yieldable means connected to the driving tube and urging the driving tube toward said conveyor rollers, whereby the portion of the driving tube opposite said slot is yieldably held in sliding bearing engagement with the bearing means of said driving elements, thereby urging the driving elements toward the rollers and urging the ripple belt in frictional engagement with the surface of said rollers, and power means for advancing said driving cable and ripple belt relative to the driving tube, whereby the ripple belt is adapted to impart rotary motion to said rollers, thereby to advance an article resting on said rollers.

2. A live roller conveyor system comprising, a conveyor frame, a series of conveyor rollers journalled in said frame, a driving tube extending parallel with the conveyor frame and having a longitudinal slot formed therein, said longitudinal slot facing said conveyor rollers, a plurality of mounting elements extending from said tube and passing slidably through said conveyor frame, a compression spring on each of said mounting elements, each of said compression springs having one end seated against said frame and having an opposite end engaging the mounting element, said compression springs urging said driving tube toward said rollers, a flexible stranded driving cable passing through said tube, a plurality of driving elements connected to said cable and slidably confined in the tube, said driving elements each including a shank portion projecting outwardly through the slot of the driving tube toward said rollers, each of said shank portions having a bifurcated outer end, and a ripple belt mounted between the said bifurcated outer ends of said driving elements, said ripple belt having a length equal to at least the spacing of adjacent conveyor rollers, and means for advancing the said driving cable relative to said tube, whereby said compression springs urge said driving tube toward said rollers, the portion of the driving tube opposite said slot thereby being held in slidable bearing engagement with said driving elements urging the driving elements toward said rollers and urging said ripple belt into frictional engagement with the surface of said rollers, adapting the ripple belt to impart rotary motion in the form of a progressive ripple to the rollers as it is advanced relative to the driving tube.

3. A live roller conveyor system comprising, a conveyor frame, a series of conveyor rollers rotatably journalled in said frame, a driving tube extending parallel with said conveyor frame and having a longitudinal slot formed therein, said longitudinal slot facing said rollers, a flexible stranded driving cable passing through said driving tube, a driving lug attached to said cable, a driving element of split construction comprising mating half-sections, said half-sections forming a bearing portion having an internal cavity, said half-sections being placed in facial engagement on opposite sides of the cable with said cavity enclosing the driving element and providing a driving connection with said cable with the said bearing portion slidably confined in the tube, said driving element having a shank portion extending outwardly through the slot of said tube, the outer end of each of said shank portions being bifurcated, a ripple belt mounted between the said bifurcated outer end of the said driving element and frictionally engaging the surface of said rollers, means for urging the driving tube toward the conveyor rollers, thereby urging the driving elements and ripple belt into frictional engagement with the surface of said conveyor rollers, and power means for advancing the said driving cable and ripple belt linearly relative to the driving tube, whereby the ripple belt is adapted to impart rotary motion to said rollers, thereby to advance an article resting on said rollers.

4. A live roller conveyor system comprising, a conveyor frame, a series of conveyor rollers journalled in said frame, a driving tube extending parallel with said conveyor frame and having a longitudinal slot formed therein, said slot facing said rollers, a flexible stranded driving cable passing through said driving tube, a plurality of cylindrical driving lugs attached to said cable in spaced relationship to one another, a plurality of split driving brackets, each of said driving brackets constituting mating half-sections, said half-sections in assembly forming a generally cylindrical bearing portion having an internal cavity of cylindrical shape rotatably confining one of said cylindrical driving lugs and providing a driving connection between said cable and driving bracket, with the bearing portion of the bracket slidably confined in said tube, each of said driving brackets having a shank portion extending outwardly through the slot of said tube, the outer end of each of said shank portions being bifurcated, a frictional element disposed between the said bifurcated ends of the shank portions, means for urging the driving tube toward the conveyor rollers, thereby to urge the bifurcated shank portions of the driving brackets and the frictional element thereof in frictional engagement with the surface of said rollers, and power means for advancing the said driving cable and friction element linearly relative to the driving tube, whereby the friction element is adapted to impart rotary motion to said rollers, thereby to advance an article resting on said rollers.

5. A live roller conveyor system comprising a conveyor frame, a series of conveyor rollers journalled in said frame, a driving tube extending parallel with said conveyor frame and having a longitudinal slot formed therein, said longitudinal slot facing said rollers, a flexible stranded driving cable passing through said driving tube, a plurality of driving lugs attached to said cable in spaced relationship to one another, a plurality of driving brackets, each of said driving brackets constituting mating half-sections, said half-sections in assembly forming a generally cylindrical bearing portion having an internal cavity confining one of said driving lugs and providing a rotatable driving connection between said cable and driving bracket, each of said driving brackets having a shank portion extending outwardly through the slot of said tube, a pair of spaced limbs formed on the outer portion of said shank, a friction element disposed between the spaced limbs, a pivot element passing through said spaced limbs and friction element, said element pivotally connecting the friction element to said spaced limbs, means for urging the driving tube toward the conveyor rollers thereby urging said driving brackets and said friction element into engagement with said conveyor rollers, the friction element thereby being frictionally engaged against the surface of said rollers by said driving brackets, and power means for advancing said driving cable and friction element relative to the driving tube, whereby the friction element is adapted to impart rotary motion to said rollers to advance an article resting upon said rollers.

6. A live roller conveyor system comprising, a conveyor frame, a series of conveyor rollers rotatably journalled in said frame, a driving tube extending along said conveyor frame, a return tube extending along said driving tube, a driving sheave mounted for rotation adjacent one end of said tubes, an idler sheave mounted for rotation adjacent the opposite end of said tubes, a flexible stranded cable loop passing about said sheaves and extending through said driving and return tubes, said driving and return tubes each having a longitudinal slot formed therein, said slot facing said conveyor rollers, a plurality of connector elements joining said tubes in spaced relationship, a plurality of driving elements connected to said cable in spaced relationship and projecting outwardly through said slots toward said rollers, roller driving means connected to the portions of said driving elements which project outwardly through said slot, and spring means interconnecting said connector elements and conveyor frame and adapted to urge the driving and return tubes toward the conveyor rollers, the portion of the driving tube diametrically opposite said longitudinal slot slidably engaging said driving elements, thereby urging said roller driving means into driving engagement with the surface of the rollers, adapting the roller driving means to be advanced by the driving sheave along the driving tube, to impart rotary motion to the rollers.

7. A live roller conveyor system comprising, a conveyor frame, a series of conveyor rollers rotatably journalled in said frame, a driving tube extending parallel with said conveyor frame along one side thereof, said driving tube being disposed above the plane of the rollers in a position to act as a guide rail with respect to an article resting upon said rollers, a return tube spaced from and extending parallel with said driving tube in an outboard position relative to the conveyor frame, a driving sheave and an idler sheave mounted for rotation adjacent opposite ends of said tubes, a flexible stranded cable loop passing about said sheaves and extending through said driving and return tubes, said driving and return tubes each having a longitudinal slot formed therein, said slot facing said rollers, a plurality of driving elements connected to said cable in spaced relationship and projecting outwardly through said slots toward said rollers, means for urging the driving tube toward said conveyor rollers thereby urging said driving elements toward the conveyor rollers, and roller driving means mounted on the outer portion of said driving elements and disposed in driving engagement with the surface of the rollers, said roller driving means adapted to be advanced by the driving sheave along the driving tube to impart rotary motion to said rollers.

References Cited in the file of this patent
UNITED STATES PATENTS

| | | |
|---|---|---|
| 1,967,747 | Eggleston | July 24, 1934 |
| 2,253,198 | Regan | Aug. 19, 1941 |
| 2,633,226 | Vogt | Mar. 31, 1953 |
| 3,040,872 | Hohl | June 26, 1962 |